US005168616A

United States Patent [19]

Klein

[11] Patent Number: 5,168,616

[45] Date of Patent: Dec. 8, 1992

[54] RIVET SHANK REMOVAL TOOL

[76] Inventor: Gregory P. Klein, P.O. Box 547, Marana, Ariz. 85653

[21] Appl. No.: 727,953

[22] Filed: Jul. 10, 1991

[51] Int. Cl.$^5$ .............................................. B23P 19/04

[52] U.S. Cl. ........................................ 29/268; 29/267; 29/278; 81/426; 81/426.5

[58] Field of Search ................. 29/221, 267, 268, 278, 29/426.4, 426.5, 246; 81/424.5, 426, 426.5

[56] References Cited

U.S. PATENT DOCUMENTS

| | | | |
|---|---|---|---|
| 380,703 | 4/1888 | Snitzel | 29/268 |
| 641,019 | 1/1900 | Keifer et al. | 29/268 |
| 777,006 | 12/1904 | Conard | 29/268 |
| 952,333 | 3/1910 | Johnson | 29/268 |
| 1,678,313 | 7/1928 | Atkinson | 29/268 |
| 2,154,580 | 4/1939 | Perria et al. | 29/268 |
| 3,063,236 | 11/1962 | Cannon | 29/268 |
| 3,314,320 | 4/1967 | Early | 29/268 |
| 4,222,985 | 9/1980 | Greenleaf | 29/268 |
| 4,617,710 | 10/1986 | Katnik | 29/268 |
| 4,787,139 | 11/1988 | Sweet | 29/268 |

FOREIGN PATENT DOCUMENTS

| | | | |
|---|---|---|---|
| 676667 | 2/1930 | France | 29/268 |

*Primary Examiner*—P. W. Echols

*Assistant Examiner*—David P. Bryant

*Attorney, Agent, or Firm*—Richard C. Litman

[57] ABSTRACT

A hand tool for the removal of rivet shanks from riveted structures provides for single handed operation by one person performing such rivet shank removal. The tool is similar to extended nose or "needle nose" pliers, with the exception of the forward ends of the upper and lower jaws. The upper jaw is provided with a downwardly facing punch at its forward end, while the lower jaw has a cooperating indentation with extensions on either side of the indentation. After removing the manufactured rivet heads and overlying sheet material, the indentation in the forward lower jaw of the tool is placed around the shop head portion of the remaining rivet and the tip of the punch of the upper jaw is placed atop the top of the remaining rivet shank. Pressure is then applied to the handles, as in using a pair of pliers, and the remaining rivet shank is pressed from the rivet hole and outward between the extensions of the lower jaw indentation. The lower jaw and its extensions serve to support the underlying structure while the rivet shank is pressed out, thus preventing deformation of the structure and enabling the rivet shank removal operation to be performed by a single person and still meet the acceptable standards and practices of repair of such structures.

4 Claims, 1 Drawing Sheet

FIG. 1
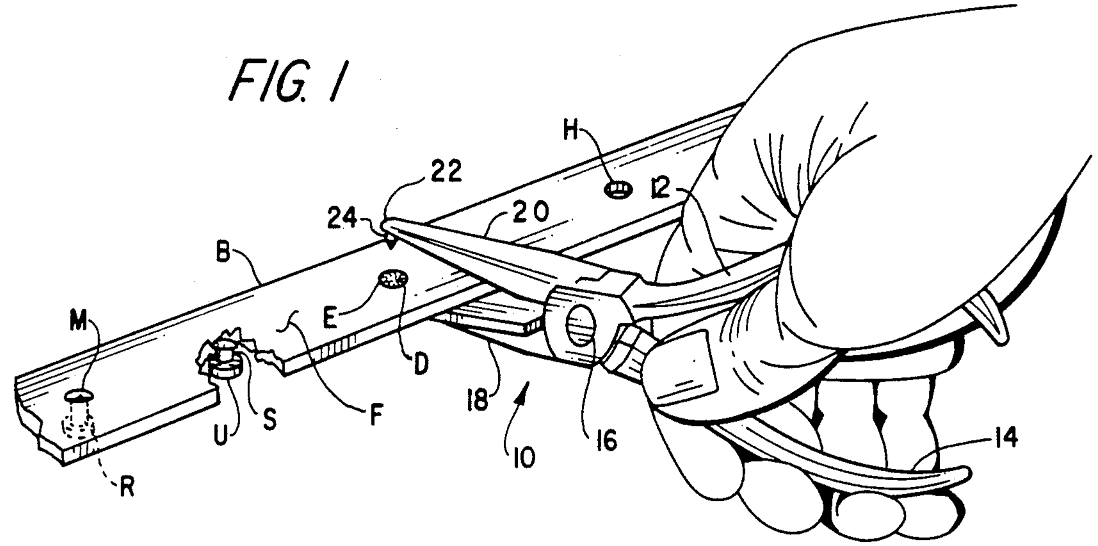
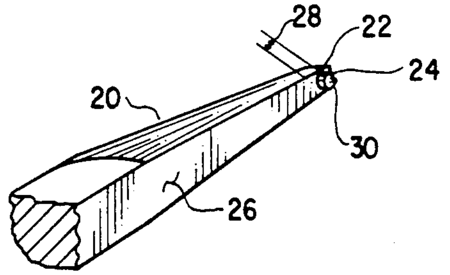
FIG. 3A
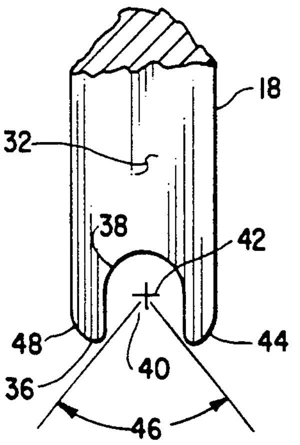
FIG. 3B
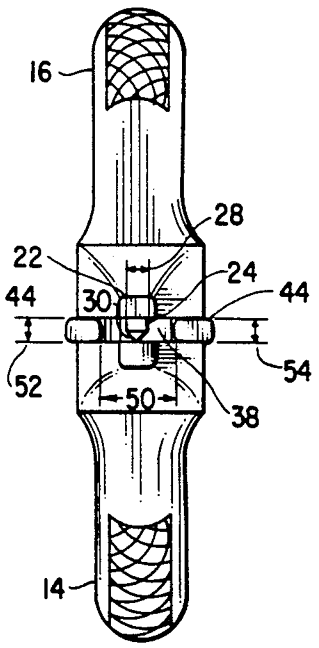
FIG. 3C
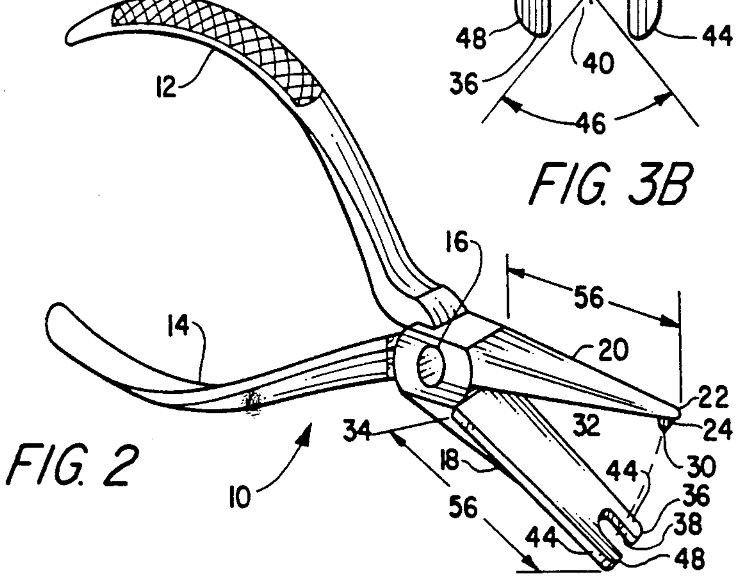
FIG. 2

RIVET SHANK REMOVAL TOOL

FIELD OF THE INVENTION

This invention relates generally to hand tools, and more specifically to a hand tool for the purpose of removing rivet shanks from riveted sheet structures.

BACKGROUND OF THE INVENTION

Modern commercially built aircraft have the majority of their structures constructed of a multitude of formed sheets of material, primarily aluminum. Generally, these sheets of material are assembled with one another by rivets. While other construction methods and materials are being developed and used commercially in the aerospace industry, the above method is likely used in the vast majority of aircraft construction, and in fact is used in some other industries also.

The above described construction method results in a relatively lightweight and sturdy structure, but when damage occurs to such a structure the accepted procedure in the aerospace industry is to completely remove the damaged components or material and replace them with new, undamaged material rather than attempting to straighten or otherwise repair the damaged components. In order to accomplish this, any rivets holding the damaged components in place must be removed. The Federal Aviation Administration (FAA) regulations require that acceptable standards and practices be used in the repair of aircraft to airworthy condition, as described in FAA Advisory Circular (AC) 43-13. AC 43-13 states that when removing rivets, the head should be weakened (but not entirely drilled through) with a drill bit of the same diameter as that of the rivet shank. A punch of the proper diameter is then inserted in the drilled hole in the rivet head and the head is snapped off, leaving the shank in the rivet hole. The rivet shank itself is not drilled out, as such a procedure would almost certainly widen or distort the rivet hole, thus requiring the extra step of redrilling the hole to the proper size for the next larger rivet size.

Standard practice for the removal of the rivet shank is to punch out the shank with a proper diameter punch. However, for relatively light weight structures formed of relatively thin sheet material, the back of the material must be supported in order to prevent the distortion of the sheet material due to the force used in driving out the rivet shank; this is especially true with relatively soft metals such as aluminum. This is commonly done with a rivet bucking bar or some other relatively massive object placed immediately adjacent the remaining "shop head" of the rivet shank, on the opposite side of the material from the "manufactured head" which was removed.

While the step of removing the manufactured rivet head is easily accomplished by a single person using the above procedure, it will be seen that at least two people are required for the step of removing the rivet shank. One person must hold the punch on the rivet shank while hammering the punch to drive out the rivet shank, while a second person must "back up" the sheet metal structure from the opposite side with a bucking bar or similar object in order to prevent distortion of the sheet metal material. Moreover, such work requires a skilled team, as the skills involved are closely related to the skills required when driving and bucking such rivets in the first place. If the person using the bucking bar does not precisely coordinate his or her efforts with the hammer blows of the person driving out the shank, the sheet material may be damaged in any case. Additionally, most bucking bars are formed with relatively straight edges, which means that the edge of such a bar will only support one side of the sheet material as the rivet shank is driven out, thus again raising the possibility of damage to the structure. Obviously, if such work is done carelessly, the repaired structure will not possess the strength of the original undamaged structure due to the possibility of elongated rivet holes and/or distorted sheet metal.

The need arises for a tool for driving out the shanks of rivets in such structures, which tool may be operated by a single person using only one hand. The tool must also provide proper support for the underlying surface as the rivet shank is driven therethrough, in order to prevent distortion of the material and/or rivet hole. Such a tool should be relatively simple in construction and operation and relatively inexpensive to purchase in order to provide the benefits of such a tool to the broadest possible number of users and thereby increase the likelihood of structurally sound repairs.

DESCRIPTION OF THE RELATED ART

P. Snitzel U.S. Pat. No. 380,703 discloses a hand operated rivet extraction and punch tool. The device contains a plurality of components in order to accomplish the desired objectives, and requires at least two hands for operation due to the need to strike a punch with a hammer to drive out the rivet while simultaneously holding the tool with the opposite hand. Moreover, the tool is exceedingly bulky and heavy due to the anvil like portion extending from one jaw.

J. Kiefer et al. U.S. Pat. No. 641,019 discloses a hand tool used in the field of shoe repair, for the purpose of driving stitching remnants from shoe sole components. The device differs from the present invention in many respects, such as the need to provide a shortened support jaw flange on one side in order that the stitching may fall clear on that side when it is punched through. Furthermore, the device uses a removable punch tip with a shoulder to prevent excessive penetration, both of which features are either unnecessary or addressed in a different manner in the present invention.

O. Johnson U.S. Pat. No. 952,333 discloses a tool for the same purpose as that of the tool of the patent cited immediately above. The tool of the Johnson patent differs in that the opening of the lower jaw which provides clearance for the removed stitching remnants is generally rectangular in shape. Such a shape would not provide the necessary support for the purpose of the present invention. In addition, a shoulder is provided on the punch portion as in the patent cited above.

R. L. S. Atkinson U.S. Pat. No. 1,678,313 discloses a hand tool for the removal of battery terminal clamps from automotive type batteries. The tool requires a relatively wide lift portion on the lower jaw, due to the typical wide dimensions of a battery terminal. The support offered by this device would not be adequate for use in the field of rivet shank removal, and moreover the upper portion is unsuited for such use due to its size and shape.

Finally, J. C. Perrin et al. U.S. Pat. No. 2,154,580 discloses a hand tool for lifting small rectangular paint refill containers from the recesses provided in paint trays for art work and the like. The device provides an upper jaw with a completely enclosed opening of essentially the same size and shape as that of the periphery of a paint refill, thus rendering such a tool impracticable for use as a rivet shank removal tool. Moreover, the lower jaw, which serves as the punch or press portion of the tool, is of a considerably larger size than that needed for the operation of the present invention, rendering the device unworkable for use as a rivet shank removal tool. It will be further noted that the general function of each of the jaws of the device are reversed in comparison to the present invention.

None of the above noted patents, either singly or in combination, are seen to disclose the specific arrangement of concepts disclosed by the present invention.

SUMMARY OF THE INVENTION

By the present invention, an improved hand tool for use in the removal of rivet shanks from riveted structures is disclosed.

Accordingly, one of the objects of the present invention is to provide an improved rivet shank removal tool which may be operated by a single person using only one hand.

Another of the objects of the present invention is to provide an improved rivet shank removal tool which does not require any additional pneumatic, electric, hydraulic or other power input other than that supplied by the hand of the user.

Yet another of the objects of the present invention is to provide an improved rivet shank removal tool which requires no additional tools to accomplish the step of rivet shank removal.

Still another of the objects of the present invention is to provide an improved rivet shank removal tool which is simple and easy to use.

An additional object of the present invention is to provide a rivet shank removal tool which is economical to manufacture, thus providing availability of the tool to virtually any person needing such a tool.

A further object of the present invention is to provide a rivet shank removal tool which use does not violate any of the acceptable standards and practices used in industry, particularly those developed and/or required by the Federal Aviation Administration in the aerospace industry.

Another object of the present invention is to provide a single rivet shank removal tool which may be used for the removal of the shanks of a wide variety of types and sizes of rivets.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 1 is a perspective view of the tool of the present invention in use.

FIG. 2 is a perspective view of the tool of the present invention showing its various features.

FIG. 3A is a perspective view of the underside of the punch end portion of the tool, with the remainder of the tool broken away.

FIG. 3B is a top view showing the details of the slotted end portion of the tool, with the remainder of the tool broken away.

FIG. 3C is an end view of the punch and slotted end portions of the tool with the jaws in a closed position.

Similar reference characters designate corresponding parts throughout the several figures of the drawings.

DESCRIPTION OF THE PREFERRED EMBODIMENT

Referring now to the drawings, particularly FIG. 1 of the drawings, the present invention will be seen to relate to a manually operated hand tool 10 for use in the repair of riveted sheet structures, for the removal of rivet shanks S from rivet holes H after removal of the manufactured rivet heads M. Tool 10 may be constructed in the general form of a pair of extended nose pliers, as is shown in FIGS. 1 and 2, but having the upper and lower jaw portions formed specifically to perform the function described above. Accordingly, tool 10 generally comprises upper and lower handles 12 and 14 respectively, which are pivotally joined together at pivot pin 16. In the manner well known in the general form of such tools, upper handle 12 extends forward past pin 16 to form lower jaw 18, and conversely lower handle 14 extends forward past pin 16 to form upper jaw 20.

Upper jaw 20 includes a forward tip 22 which provides for a punch 24 which extends downward from the underside 26 of upper jaw 20, the details of which may be seen more clearly in FIG. 3A. Punch 24 may be formed by bending upper jaw forward tip downward approximately 90 degrees, or may be formed as shown in the various drawing figures as a cylindrical punch tip having a uniform diameter 28. Punch 24 may also include a convex conical tip 30, which provides a centering effect for tool 10 when used as intended.

Lower jaw 18 is provided with a generally flat upper surface 32 which extends from the rear portion 34 to the forward tip 36 of lower jaw 18. Lower jaw upper surface 32 and the underside 26 of upper jaw 20 are so arranged that they will be in contact with one another when handles 12 and 14 are closed together, as in the manner well known in such tools in general and shown in FIG. 3C.

It will be seen from the above description that provision must be made at the forward tip 36 of lower jaw 18 for clearance of punch 24 when jaws 18 and 20 are closed, as punch 24 extends downward from the underside or lower surface 26 of upper jaw 20. This provision comprises a preferably semicircular inset portion or indentation 38 which opening 40 faces forward and is adjacent to the extreme forward tip 36 of lower jaw 18. The center 42 of inset 38 is formed so as to be concentric with the tip 30 of punch 24 when jaws 18 and 20 are closed.

The forward tip 36 of lower jaw 18 will thus be seen to have extensions 44 to either side of inset 38. Preferably, extensions 44 are sufficiently long to extend forward somewhat beyond inset center 42, and to provide an inset opening angle 46 between extensions 44 of some 90 degrees when measured from inset center 42, as shown in FIG. 3B. Thus, extensions 44 will be seen to surround the majority of punch 24 when lower and upper jaws 18 and 20 are closed, or other object such as a rivet shank S when tool 10 is used for the removal of such a shank S. Extensions 44 will thus assist in the support of the overlying structure when tool 10 is in use, as will be further described below. It will be further noted that the exterior corners 48 of extensions 44 are rounded, in order to prevent marring any material with which they may come in contact. While greater support would be provided for any overlying material by completely surrounding indentation 38 with extensions 44 of lower jaw 18, and thus providing a hole for the passage of any rivet shank S therethrough as tool 10 is used. However, the additional material forward of indentation 38 might preclude the use of tool 10 in cases where a rivet R has been driven in close proximity to a bend radius B of a flange F or other material. Thus, the forward end or tip 36 of lower jaw 18 of tool 10 is preferably formed as described above.

Rivets are manufactured in many varieties, depending upon the shape of the manufactured head, material, length and diameter of the shank. The nomenclature used to describe these various rivets generally uses a numerical system which for the most part is beyond the scope of this discussion. However, one of the numbers in the rivet description system refers to the diameter of the rivet shank. This number will be in 1/32 inch increments, thus a "number four" rivet shank size would have a diameter of 4/32 nds of an inch, or $\frac{1}{8}$ inch diameter. The typical rivet used in relatively lightweight structural areas range from no. 2 to no. 4, or from 1/16 inch to $\frac{1}{8}$ inch shank diameter. Larger diameter rivets may be used in heavier structures with thicker material.

Tool 10 is intended for use in driving out rivet shanks S in relatively light structures, as noted above. Thus, it is anticipated that the diameter 28 of punch 24 will not exceed that of the smaller diameter rivets R (and thus rivet holes H) likely to be encountered, or some 1/16 inch. However, such a relatively small punch diameter 28 may also obviously be used to drive out larger diameter rivet shanks S, up to the limit provided by other dimensions and capacities of tool 10.

The limiting factor relating to the maximum size rivet shank S which may be driven out with tool 10, is the width 50 between lower jaw extensions 44. This width 50 must be sufficiently wide so as to provide clearance for the shop head (sometimes called the "upset head") U of the larger rivets R with which tool 10 may be used. Typically, such a shop head U will not exceed twice the diameter of the rivet shank S, thus tool 10 will nominally provide a width 50 between lower jaw extensions 44 of $\frac{1}{4}$ inch. Obviously, tool 10 may be constructed to handle larger rivet shank S and shop head U diameters, but as such larger rivet dimensions are typically used in heavier structures constructed of thicker materials, it is more difficult to press such larger diameter rivet shanks from a rivet hole with a hand tool such as tool 10 and still retain the advantageous features of tool 10. However, such structures constructed of thicker materials are more resistant to the bending and deformation which may be caused by merely using a hammer and punch to drive out such larger diameter rivets, and thus such a technique is generally acceptable in such cases.

As noted above, tool 10 is intended for use in structures constructed of relatively thin materials. Typically such materials with which rivet shank diameters of 1/16 inch to $\frac{1}{8}$ inch (no. 2 to no. 4 rivets) are likely to be used, will be of a thickness on the order of 0.016 inch to 0.035 inch. Thus, punch 24 need not have a length 52 exceeding the maximum dimension of the material with which tool 10 is to be used, assuming plain (i.e., rounded head rivets which do not require a countersunk or dimpled rivet hole H) rivets R are used. It will be noted, however, that for structural reasons the thickness 54 of lower jaw forward tip 36 must be sufficient to support the underlying material around a rivet hole H, and thus must be on the order of some 1/16 inch thick or perhaps slightly more. Nevertheless, it is advantageous for lower jaw forward tip 36 to be as thin as practicable in order that tool 10 may be used in relatively inaccessible areas.

It will be appreciated by those knowledgeable in the art that in many cases flat head rivets (not shown) are used in such structures as described herein. Such rivets will require that the upper surface of the structure be countersunk in order to fit the convex conical base of such flat head rivets, or in the case of thin structural materials that the relatively thin sheets be dimpled to provide the required fit. Such a dimpled rivet hole will have a flange (not shown) extending slightly below the surrounding surface of the material. In such cases, it will be necessary to provide tool 10 with a punch 24 which extends somewhat below the upper surface 32 of lower jaw 18 when the upper and lower jaws 20 and 18 are closed. By providing punch 24 with a length 52 which is essentially equal to the thickness 54 of lower jaw forward tip 36 and extensions 44, tool 10 may be used to drive out the shanks S of flat head rivets as well as standard rivets R. The use of tool 10 in either case is identical, once the head of any rivet is removed prior to the use of tool 10. As the diameter of any dimpled area surrounding a rivet hole is not likely to exceed that of the shop head U of a rivet, the width 50 between lower jaw extensions 44 need not exceed that required for clearance of the shop heads U of the larger rivets R with which tool 10 is intended to be used.

Tool 10 is intended to be used to punch or press out the remaining rivet shank S and shop head U of a rivet R after the manufactured head M has been drilled and broken off in accordance with accepted practice in the repair of riveted sheet structures. It will be understood that the overlying sheet of material will be removed from the structure once all of the manufactured rivet heads M have been removed, thus making the underlying structure accessible for the use of tool 10 as shown in FIG. 1. Typically, such underlying structure will have a relatively narrow flange F of material through which rivet shanks S pass in order to hold the overlying material in place. Thus, the length 56 of upper and lower jaws 20 and 18 need not be excessive; a length 56 comparable to that of known extended nose pliers will be adequate in the vast majority of cases where tool 10 will be used.

Once the overlying sheet material has been removed as discussed above, tool 10 may be applied to the individual rivet shanks S which remain in flange F in accordance with the view shown in FIG. 1. Lower jaw 18 is inserted beneath the flange F with lower jaw semicircular indentation 38 closely surrounding the shop head U of the portion of rivet R remaining within the hole H, and the upper surface 32 of lower jaw 18 parallel to and in contact with the underlying surface of flange F or other material. By forming indentation 38 in a semicircular shape, the shape of indentation 38 will conform closely to the shape of the partially surrounded shop head U and thus serve to provide better support for the overlying flange F or other material. In this manner, lower jaw extensions 44 will extend to either side of the shop head U and serve to further support the overlying flange F or other material through an arc of some 270 degrees around the shop head U.

Handles 12 and 14 may then be squeezed together in order to cause upper jaw 20 to close toward lower jaw 18 and flange F. As the center 42 of indentation 38 will be essentially concentric with the remaining rivet shank S and shop head U when tool 10 is positioned as described above, punch 24 will automatically be concentric with the remaining drilled upper end E of rivet shank S. Conical tip 30 of punch 24 will therefore also be essentially concentric with the depression D which is automatically formed in the upper end E of a rivet shank S when the manufactured head M is drilled and removed.

As handles 12 and 14 are squeezed further together, upper jaw 20 will be forced closer to flange F, thus causing punch 24 to contact the upper end E of rivet shank S. Further pressure will cause punch 24 to force rivet shank S through rivet hole H and outward to pass through indentation 38 between extensions 44 of lower jaw 18. Distortion of flange F by the pressure exerted as rivet shank S is forced through flange F is prevented due to the closely fitting semicircular indentation 38 and extensions 44 of lower jaw 18. Thus, tool 18 may be used by a single person using only one hand to accomplish the task of removing rivet shanks S from rivet holes H without risk of damage to the surrounding flange F or other material, and in accordance with standards and practices acceptable to the Federal Aviation Administration as described in FAA Advisory Circular 43-13. The potential improvement in the safe repair of riveted sheet material structures, as well as the time and labor saved by the use of tool 10 in such repairs, is evident from the foregoing.

It is to be understood that the present invention is not limited to the sole embodiment described above, but encompasses any and all embodiments within the scope of the following claims.

I claim:

1. A hand operated rivet shank removal tool for use in the removal of rivet shanks in rivet holes of riveted sheet material structures, said tool comprising;

an upper and a lower handle each respectively joined to a lower and an upper jaw, said lower and upper jaws and said upper and lower handles pivotable with respect to one another about an axis, said lower jaw including a flat upper surface having a forward end terminating in an indentation having a semicircular shape, said indentation having a center and having extensions equally spaced to each side thereof, said upper jaw having a forward end terminating in a single downwardly extending cylindrical punch, said punch including a conical tip, said punch concentric with said indentation and extending therethrough when said jaws are in a closed position, whereby said tool is usable to drive said rivet shanks from said rivet holes in said structures by means of said punch forcing each said rivet shank through each said hole and said indentation when said tool is operated.

2. A tool according to claim 1 wherein;

said extensions provide an included angle of 270 degrees around said indentation.

3. A tool according to claim 1 wherein;

said extensions have exterior corners, and said exterior corners are rounded.

4. A hand operated rivet shank removal tool for use in the removal of rivet shanks in rivet holes of riveted sheet material structures, said tool comprising;

an upper and a lower handle, each respectively joined to a lower and an upper jaw, said lower and upper jaws and said upper and lower handles being pivotable with respect to one another about an axis, said lower jaw having a forward end terminating in an indentation of semicircular shape with extensions equally spaced to each side of a center of said indentation, said extensions providing an included angle of 270 degrees around said indentation, said extensions having exterior corners, and said exterior corners being rounded, said forward end of said lower jaw having a thickness of one-sixteenth of an inch, said upper jaw having a forward end terminating in a downwardly extending punch, said punch having a cylindrical body and a conical tip, said cylindrical body having a diameter of one-sixteenth of an inch, said punch having a total length of one-sixteenth of an inch, said punch being concentric with said indentation, whereby said tool is usable to drive said rivet shanks from said rivet holes in said structures by means of said punch forcing each said rivet shank through each said hole and said indentation when said tool is operated.

* * * * *